United States Patent [19]
Mori et al.

[11] Patent Number: 5,539,180
[45] Date of Patent: Jul. 23, 1996

[54] METHOD OF LASER BEAM WELDING GALVANIZED STEEL SHEETS WITH AN AUXILIARY GAS CONTAINING OXYGEN

[75] Inventors: Atsushi Mori; Yoshinori Nakata, both of Minamitsuru-gun; Etsuo Yamazaki, Hachioji, all of Japan

[73] Assignee: Fanuc, Ltd., Yamanashi, Japan

[21] Appl. No.: 859,387

[22] PCT Filed: May 31, 1991

[86] PCT No.: PCT/JP91/00752

§ 371 Date: May 26, 1992

§ 102(e) Date: May 26, 1992

[87] PCT Pub. No.: WO92/15422

PCT Pub. Date: Sep. 17, 1992

[30] Foreign Application Priority Data

Feb. 28, 1991 [JP] Japan ..................... 3-57859
Apr. 19, 1991 [JP] Japan ..................... 3-115397

[51] Int. Cl.⁶ .......................... B23K 26/12; B23K 26/14
[52] U.S. Cl. ................... 219/121.64; 219/121.84
[58] Field of Search .................. 219/121.63, 121.64, 219/121.84

[56] References Cited

U.S. PATENT DOCUMENTS 4,684,779  8/1987  Berlinger et al. .................. 219/121.84
4,945,207  7/1990  Arai ..................... 219/121.84
5,142,119  8/1992  Hillman et al. ................... 219/121.64

FOREIGN PATENT DOCUMENTS

| 56-62688 | 5/1981 | Japan | 219/121.64 |
| 60-121097 | 6/1985 | Japan | 219/121.84 |
| 62-296982 | 12/1987 | Japan | 219/121.64 |
| 1-122684 | 5/1989 | Japan | 219/121.64 |
| 90/00458 | 1/1990 | WIPO | 219/121.84 |
| WO-A-9102621 | 3/1991 | WIPO . | |

*Primary Examiner*—Geoffrey S. Evans
*Attorney, Agent, or Firm*—Staas & Halsey

[57] ABSTRACT

Oxygen is mixed with another gas to form an auxiliary gas that will permit a welding of zinc-plated steel sheets (3a and 3b) without producing blowholes. An oxygen ($O_2$) gas cylinder (4a) is provided in addition to an argon (Ar) gas cylinder (4b), for forming the mixed auxiliary gas, and the argon gas and the oxygen gas are mixed in a mixer (6) before being supplied to a machining head (7) and jetted onto a machining spot (9) through a nozzle (8). The oxygen oxidizes the zinc of the zinc-plated steel sheets (3a and 3b) to produce zinc oxide and zinc peroxide, to thereby prevent evaporation and minimize spatters, and thus permits a laser welding with a minimum generation of blowholes.

9 Claims, 11 Drawing Sheets

METHOD OF LASER BEAM WELDING GALVANIZED STEEL SHEETS WITH AN AUXILIARY GAS CONTAINING OXYGEN

TECHNICAL FIELD

The present invention relates to a laser apparatus and a laser beam welding method of welding a surface-treated metal, and more particularly, to a laser apparatus and a laser beam welding method of welding a zinc-plated steel sheet with laser beams.

BACKGROUND ART

The increasing output of laser oscillators has led to an expansion of the fields of application for laser beam welding, which uses laser beams in place of the conventional gas welding or electrical welding. In particular, there is a strong demand for the capability to weld superimposed steel sheets and the like in the automobile industry. Namely, the steel sheets used in the automobile industry are zinc-plated steel sheets treated with zinc plating for the purpose of rust prevention, and a stable and high-speed laser beam welding of such zinc-plated steel sheets and the like is now required.

When welding superimposed zinc-plated steel sheets, however, a surface plating layer on the steel sheet is evaporated when irradiated with a laser beam, causing the generation of many blowholes. In particular, if there is no gap between the steel sheets, the steam of evaporated zinc blows off the molten base metal, making welding impossible. This is considered to be because zinc has a lower boiling point than the melting point of iron, and because the evaporating pressure is high, thus causing the molten iron to be blown off.

Accordingly, when welding superimposed zinc-plated steel sheets, a gap of few hundred microns is provided between the steel sheets to allow the zinc steam generated on the surfaces thereof to escape. Nevertheless, it is extremely difficult to maintain the gap at a fixed value, at an actual production site, and thus the laser beam welding must be carried out while the steel sheets are in close contact with one another.

DISCLOSURE OF THE INVENTION

The present invention is intended to solve the foregoing problems, and an object of the present invention is to provide a laser apparatus capable of producing a stable welding of surface-treated metals such as zinc-plated steel sheets while such sheets are in close contact with one another.

Another object of the present invention is to provide a laser beam welding method permitting a laser beam welding during which the occurrence of blowholes on surface-treated metals such as zinc-plated steel sheets is kept to a minimum.

To fulfill the above-mentioned object, the present invention provides a laser apparatus designed to weld a surface-treated metal coated with a material having an evaporation temperature lower than the melting point of the metal, by using continuous wave or pulse wave laser beams, the laser apparatus comprising a gas supply unit for supplying oxygen or oxygen and another gas as an auxiliary gas, and an auxiliary gas jetting unit for jetting the auxiliary gas onto a welding spot.

Further, a laser beam welding method of welding surface-treated metals coated with materials having an evaporation temperatures lower than the melting points of the metals, by using continuous wave or pulse wave laser beams is provided, wherein oxygen or a mixture of oxygen and another gas is used as an auxiliary gas for the welding.

Conventionally, oxygen gas is not used for welding because it will ignite the iron, but when a laser beam is irradiated onto a surface-treated metal such as a zinc-plated steel sheet in an atmosphere of an auxiliary gas including oxygen gas or a mixture of oxygen gas and another gas, the material is ignited and forms a molten pool of a mixture of oxygen and iron. Such a molten pool has a low viscosity, allowing an easy escape of zinc steam.

Further, oxygen and zinc react to produce zinc oxide or zinc peroxide rather than steam, and therefore, when a laser beam passes therethrough, the iron oxide is separated as slag on the surface of the steel sheet, and an unoxidized part of the molten iron is solidified, to thereby obtain a strong weld. The zinc layer of the zinc-plated steel sheet is thinner than the steel sheet, and thus has no affect on the strength thereof after welding.

Furthermore, the heat generated by the reaction between oxygen and iron makes a significant contribution to the welding, and as the type of reaction that takes place depends on the concentration of oxygen gas, the type of other gas used, the beam focusing method, the pulse irradiation, and other conditions, the presence of oxygen gas provides the required effect.

Accordingly, the laser apparatus is equipped with a gas supply unit for supplying oxygen gas when conducting a laser beam welding.

BRIEF DESCRIPTION OF THE DRAWINGS

FIG. 2 shows welding conditions of the embodiment, FIG. 2(A) being a view observed from the side with respect to the direction of advance of a machining head, and FIG. 2(B) being a view observed from the front with respect to the direction of advance of the machining head;

FIG. 3 shows surface welded conditions when oxygen gas is not used, FIG. 3(A) being a view observed from the side with respect to the direction of advance of the machining head, and FIG. 3(B) being a view observed from the front with respect to the direction of advance of the machining head;

FIG. 4 shows surface conditions of a welded spot in the present embodiment, FIG. 4(A) illustrating a condition of the back surface, and FIG. 4(B) illustrating a condition of the top surface;

FIG. 5 shows surface conditions of a welded spot when oxygen gas is not used, FIG. 5(A) illustrating a condition of the back surface, and FIG. 5(B) illustrating a condition of the top surface;

BEST MODE OF CARRYING OUT THE INVENTION

An embodiment of the present invention will now be described with reference to the accompanying drawings.

Figure 1:
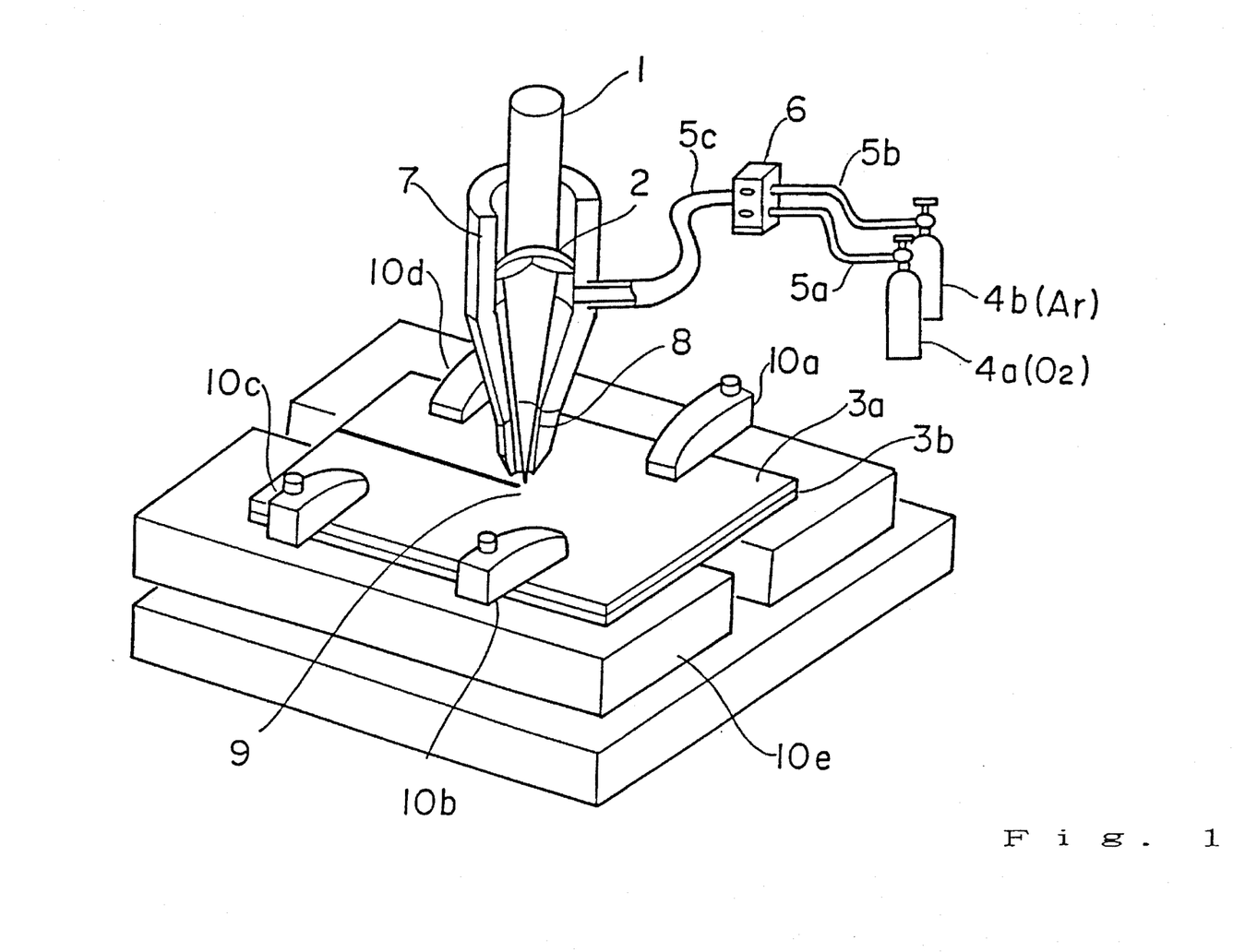
FIG. 1 is an external view of a laser apparatus of an embodiment according to the present invention.

FIG. 1 is the external view of the laser apparatus according to an embodiment of the present invention. As shown in the figure, a laser beam 1 is passed through and focused by a lens 2, is output through a nozzle 8, and is irradiated onto zinc-plated steel sheets 3a and 3b. The lens 2 is fixed to a machining head 7, and the zinc-plated steel sheets 3a and 3b are fixed to a table 10e by clamps 10a, 10b, 10c, and 10d.

Oxygen gas and argon gas are supplied from an oxygen ($O_2$) gas cylinder 4a and an argon (Ar) gas cylinder 4b via hoses 5a and 5b, respectively, and are mixed in a mixer 6 before being supplied to the machining head 7 via a hose 5c, to be then jetted through the nozzle 8 onto a machining spot 9.

The oxygen gas combines with zinc to produce zinc oxide and zinc peroxide, which are solids and suppress zinc evaporation, to thus control the generation of blowholes, and further, the heat generated by this combination facilitates the welding.

In this case, the thickness of the zinc-plated steel sheets 3a and 3b is 0.9 mm, the laser output is 3 kW, the feeding speed is 1.5 m/min., the ratio of the oxygen gas to the argon gas is 4:1, and the total volume of the auxiliary gas is 20 L/min. The laser beam is a pulse wave type.

Figure 2:
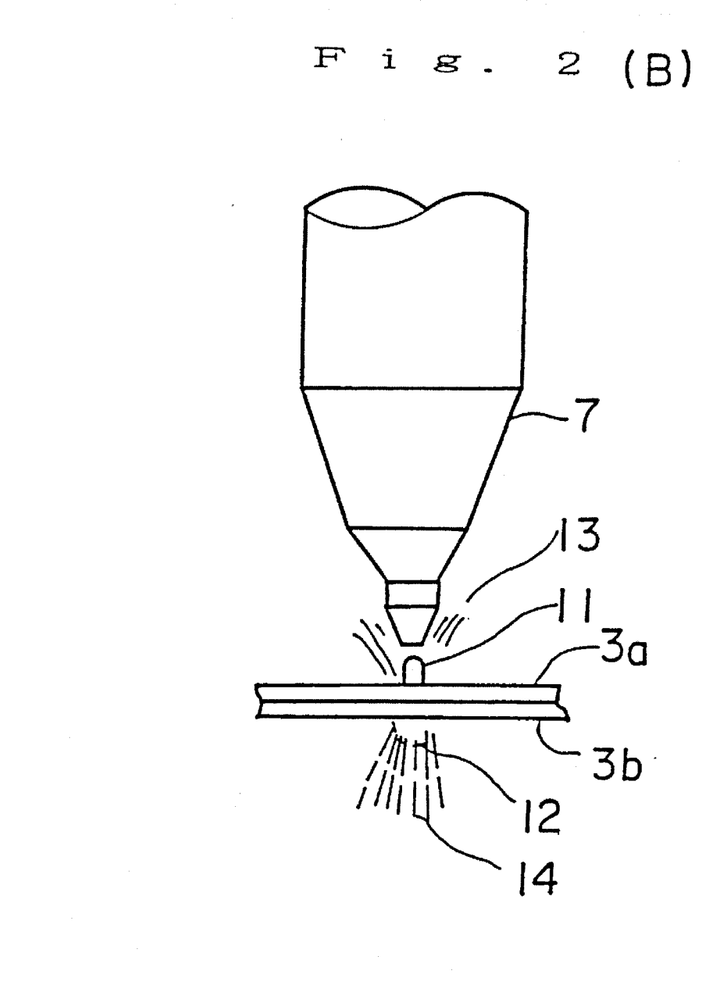

FIG. 2 illustrates the welding conditions according to the present embodiment; wherein FIG. 2(A) is a view observed from the side with respect to the direction of advance of the machining head 7, and FIG. 2(B) is a view observed from the front with respect to the direction of advance of the machining head 7. In this example, fumes (clouds of a gas that has been evaporated and ionized) 11 and 12 are generated over the zinc-plated steel sheet 3a and under the zinc-plated steel sheet 3b. Also, spatters (molten lumps of metal sprung out) 13 and 14 are produced at the top and bottom, but the volume thereof is low.

Figure 3:
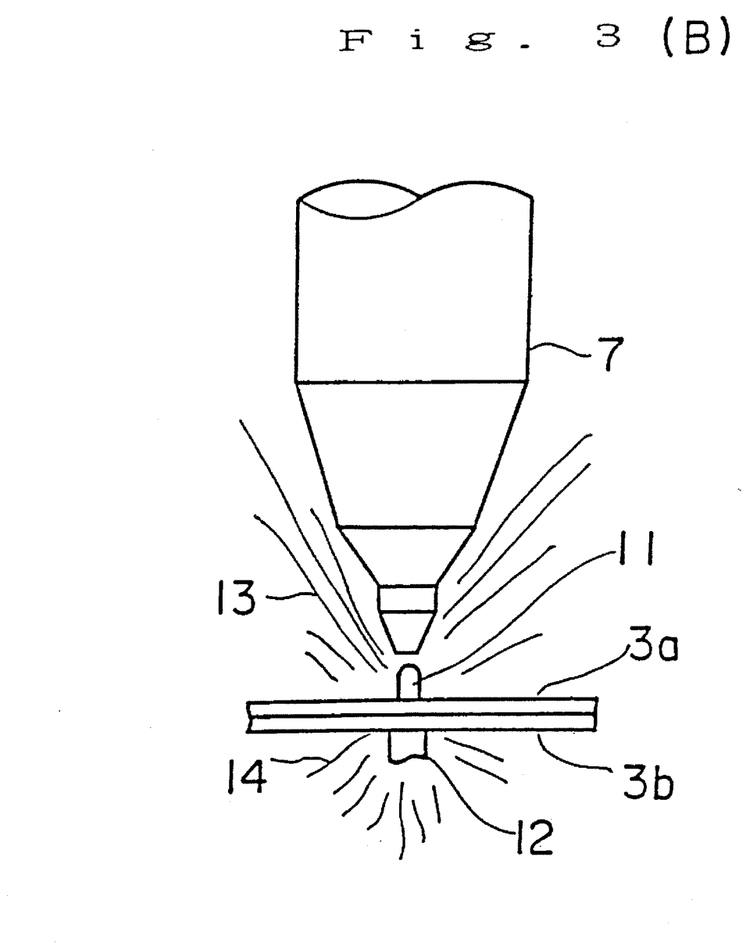

FIG. 3 illustrates the conditions of a welded surface when oxygen gas is not used; wherein FIG. 3(A) is a view observed from the side with respect to the direction of advance of the machining head 7, and FIG. 3(B) is a view observed from the front with respect to the direction of advance of the machining head 7. In this example, fumes (clouds of a gas that has been evaporated and ionized) 11 and 12 are generated over the zinc-plated steel sheet 3a and under the zinc-plated steel sheet 3b, and further, spatters (molten lumps of metal sprung out) 13 and 14 are produced at the top and bottom; in this case, the volume thereof is very high.

Namely, as obvious from FIG. 2 and FIG. 3, it is possible to control the evaporation of zinc and to control spatters by mixing oxygen gas with the auxiliary gas.

Figure 4A:
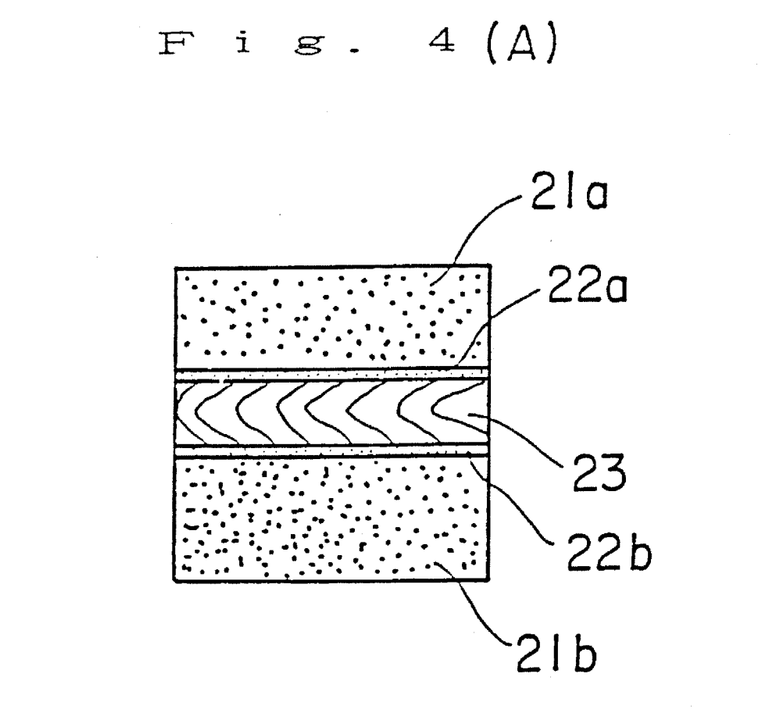
Figure 4B:
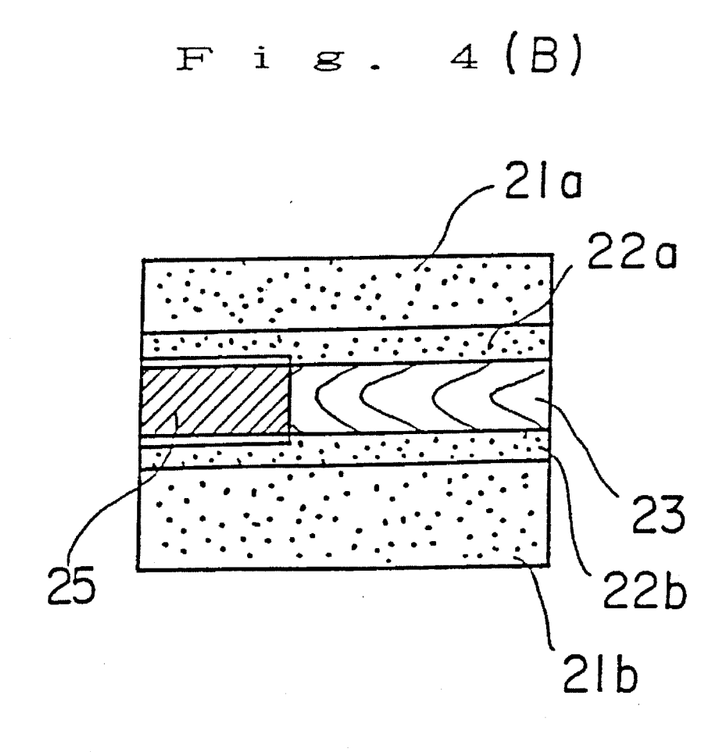

FIG. 4 illustrates the surface conditions of a welded spot according to the present embodiment; wherein FIG. 4(A) shows the condition of the back surface, and FIG. 4(B) shows the condition of the top surface. As shown in the figures, parts 22a and 22b composed of deep-yellow powder and parts 21a and 21b composed of light-yellow powder are generated on either side of a bead 23. FIG. 4(B) shows that the bead 23 has a partly developed slag 25. As can be seen, in this example very few blowholes are generated.

Figure 5A:
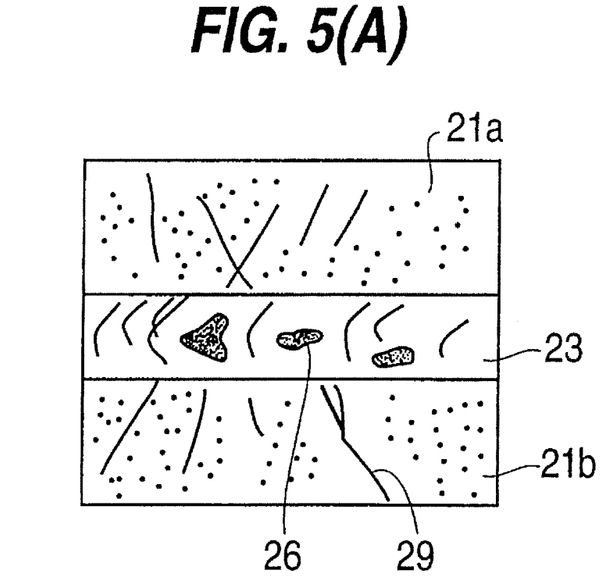
Figure 5B:
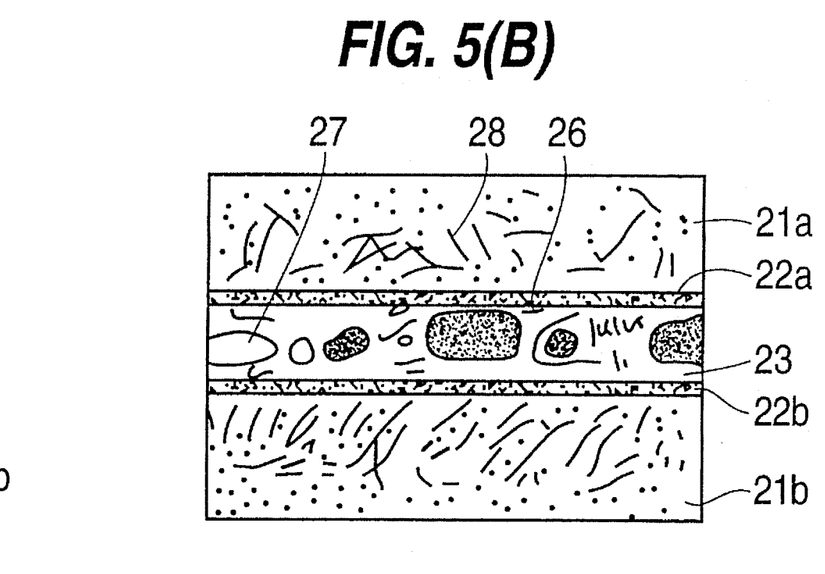

FIG. 5 illustrates the surface conditions of a welded spot when oxygen gas is not used; wherein FIG. 5(A) shows the condition of the back surface, and FIG. 5(B) shows the condition of the top surface. As shown in the figures, parts 22a and 22b composed of a deep-yellow powder and parts 21a and 21b composed of a light-yellow powder are generated on either side of the bead 23. As can be seen, in this case many non-through blowholes 26 and through blowholes 27 are generated in the bead 23, and further, a black powder 28, which indicates the presence of zinc and carbide, is produced and many traces of spatter 29 can be observed.

Therefore, as is obvious from FIG. 4 and FIG. 5, the use of an auxiliary gas that is a mixture of oxygen gas and argon gas produces a stable welding while keeping the generation of blowholes to a minimum.

An increase in the proportion of oxygen in accordance with an increase in the welding speed produces a better effect, and it is also necessary to increase the proportion of oxygen in accordance with an increase in the output power. Note, the same effect can be obtained with helium gas, nitrogen gas or a mixture of one of these two gases with oxygen, instead of argon gas. Further, since the thickness of the zinc of the zinc-plated steel sheet is small, problems with the welding strength due to slag produced due to the use of oxygen will not arise.

Figure 6:
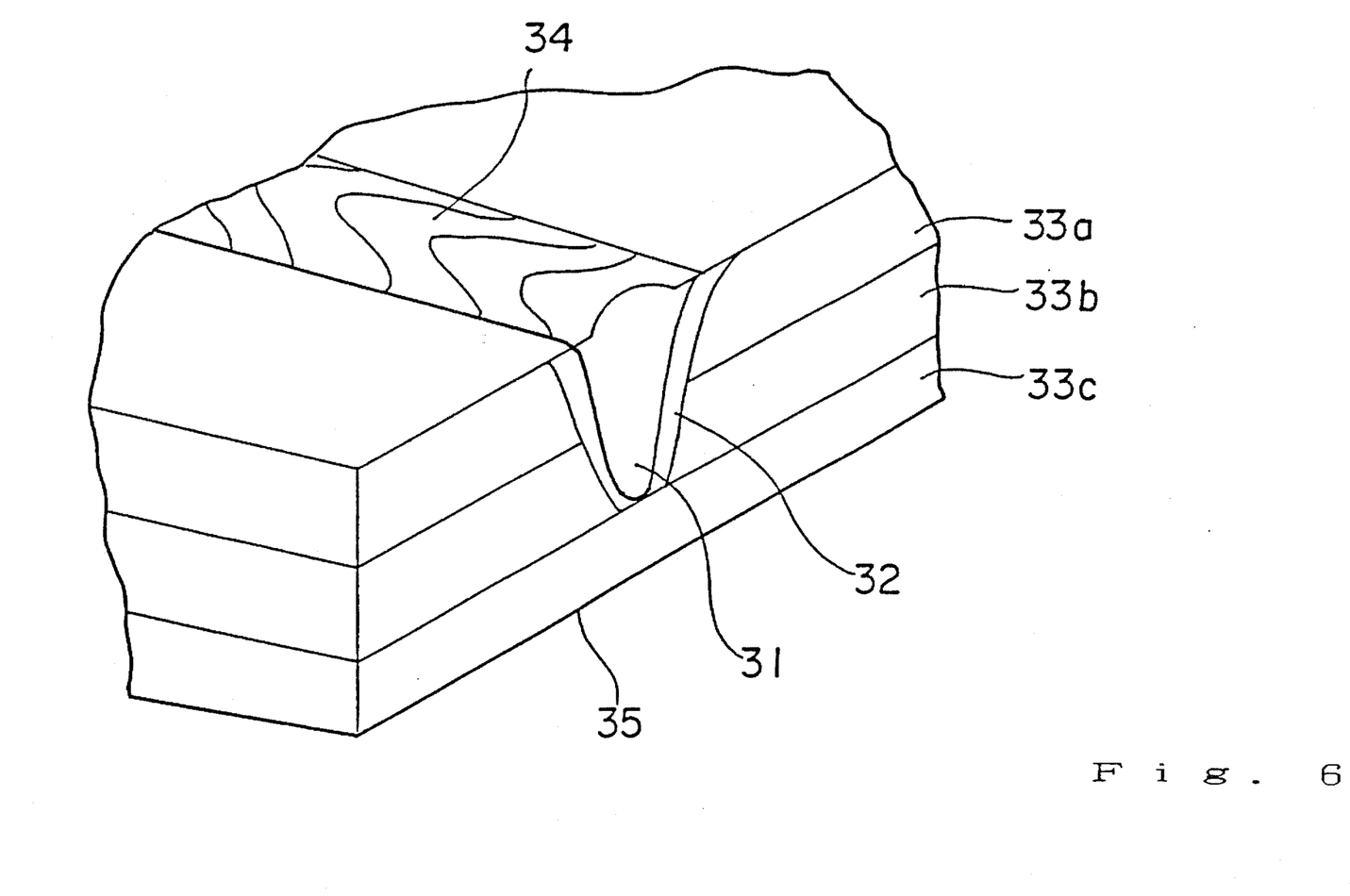
FIG. 6 shows an example wherein three zinc-plated steel sheets are superimposed one on the other and then welded.

FIG. 6 illustrates an example in which three zinc-plated steel sheets are superimposed one on the other and then welded. Here, although three zinc-plated steel sheets 33a, 33b, and 33c are superimposed, only the zinc-plated steel sheets 33a and 33b are melted to form a bead 34. As can be seen, portion 32 subjected to thermal influences is produced outside of a molten portion 31, but no thermal influence is applied to the zinc-plated steel sheet 33c. This welding operation is performed by selecting the output power of the laser beam, the frequency, the duty ratio, and the welding speed according to need. Note, as the welding operation does not thermally affect the zinc-plated steel sheet 33c, it can be effectively used for welding a spot or the like where a thermal influence must not be applied to a surface opposite to the welded surface.

Figure 7:
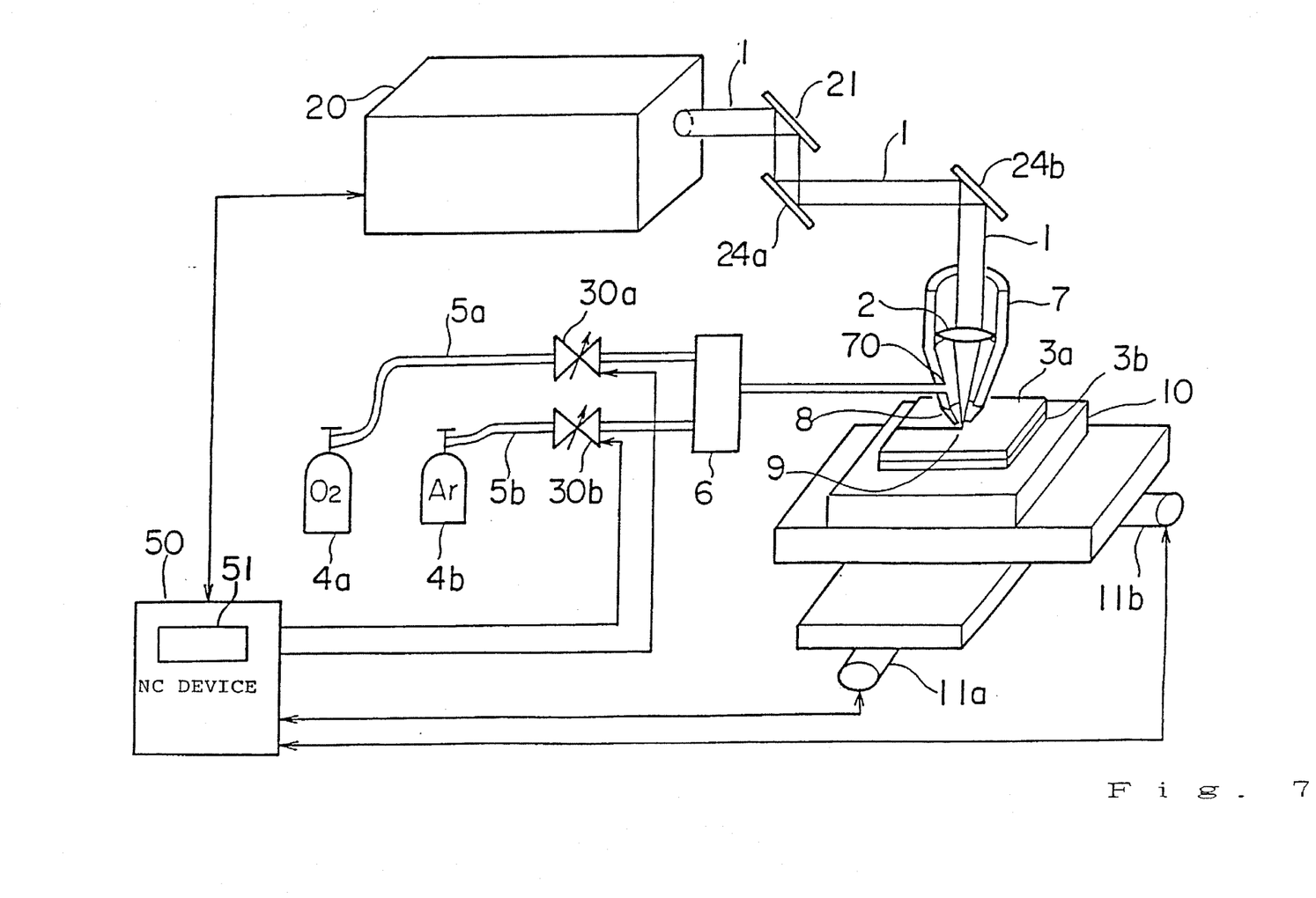
FIG. 7 illustrates the second embodiment of the present invention.

FIG. 7 illustrates the second embodiment of the present invention. As shown in the drawing, a laser beam 1 emitted from a laser oscillator 20 is guided to a machining head 7 through a circular polarimeter and plane mirrors 24a and 24b. The laser beam 1 is then passed through and focused by a lens 2 and irradiated onto zinc-plated steel sheets 3a and 3b, to thereby carry out a laser welding thereof. At the same time, oxygen gas and argon gas are introduced from an oxygen gas cylinder 4a and an argon gas cylinder 4b, respectively, are passed through control valves 30a and 30b, respectively, into a mixer 6, and are then mixed together before being supplied as an auxiliary gas to a nozzle 8, through a gas inlet 70 of the machining head 7, and jetted onto a machining spot 9.

An NC device 50 controls the laser oscillator 20 and drives servomotors 11a and 11b of a table 10, through a machining program. Further, the NC device calculates the mixing proportion and flow rate of the auxiliary gas according to data stored in a memory 51, and drives the control valves 30a and 30b in accordance with the results of the calculation. This procedure ensures a supply of the auxiliary gas having an optimum mixing proportion and flow rate at all times, to thereby carry out a good laser welding.

The following is an explanation of the optimum welding condition ranges of the auxiliary gas. Here, the optimum ranges refer to ranges within which blowholes are not produced and slag is kept to a minimum.

Figure 8:
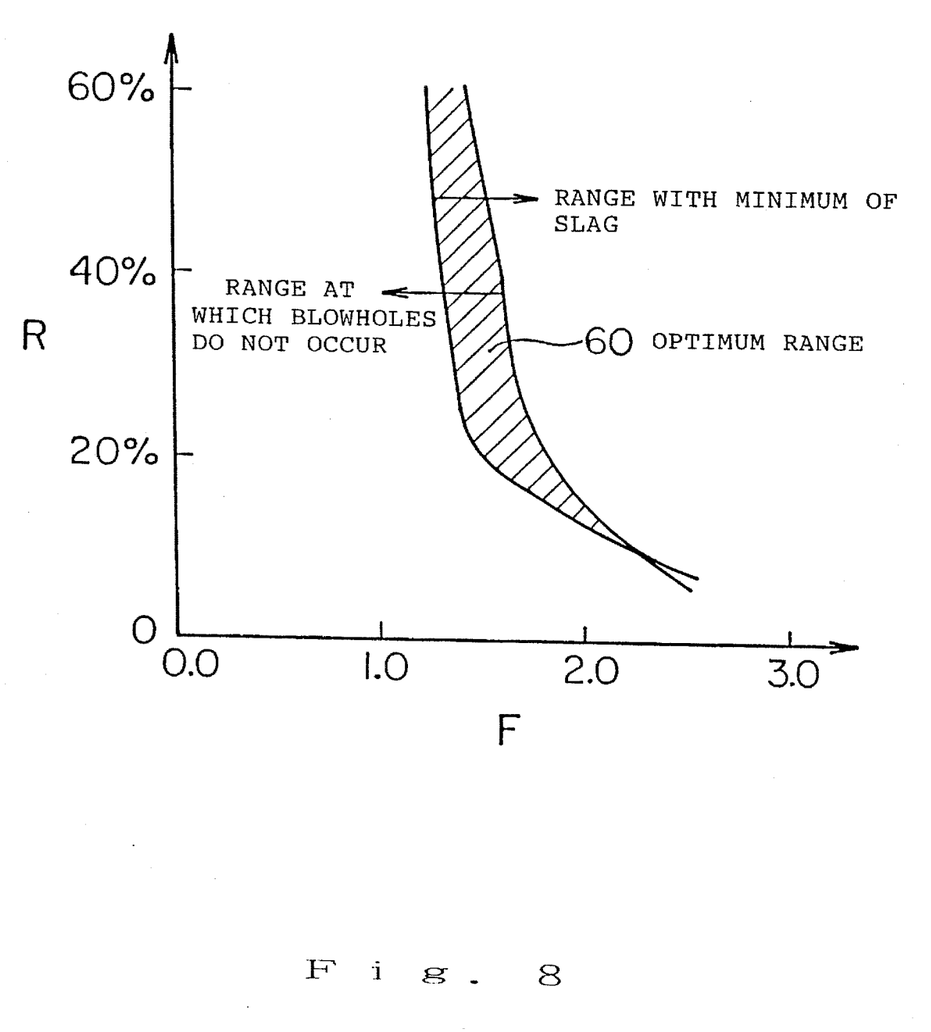
FIG. 8 illustrates an optimum range of a mixing proportion of an auxiliary gas in relation to a table feed speed.

FIG. 8 illustrates an optimum mixing proportion range of the auxiliary gas in relation to the table feeding speed. As shown in the figure, a mixing ratio R ($=Ar/(Ar-O_2)$) of the auxiliary gas in an optimum range 60 is lowered as the feeding speed (welding speed) F of the table 10 is increased; this means that it is necessary to increase the proportion of oxygen in the auxiliary gas as the feeding speed F is increased.

Figure 9:
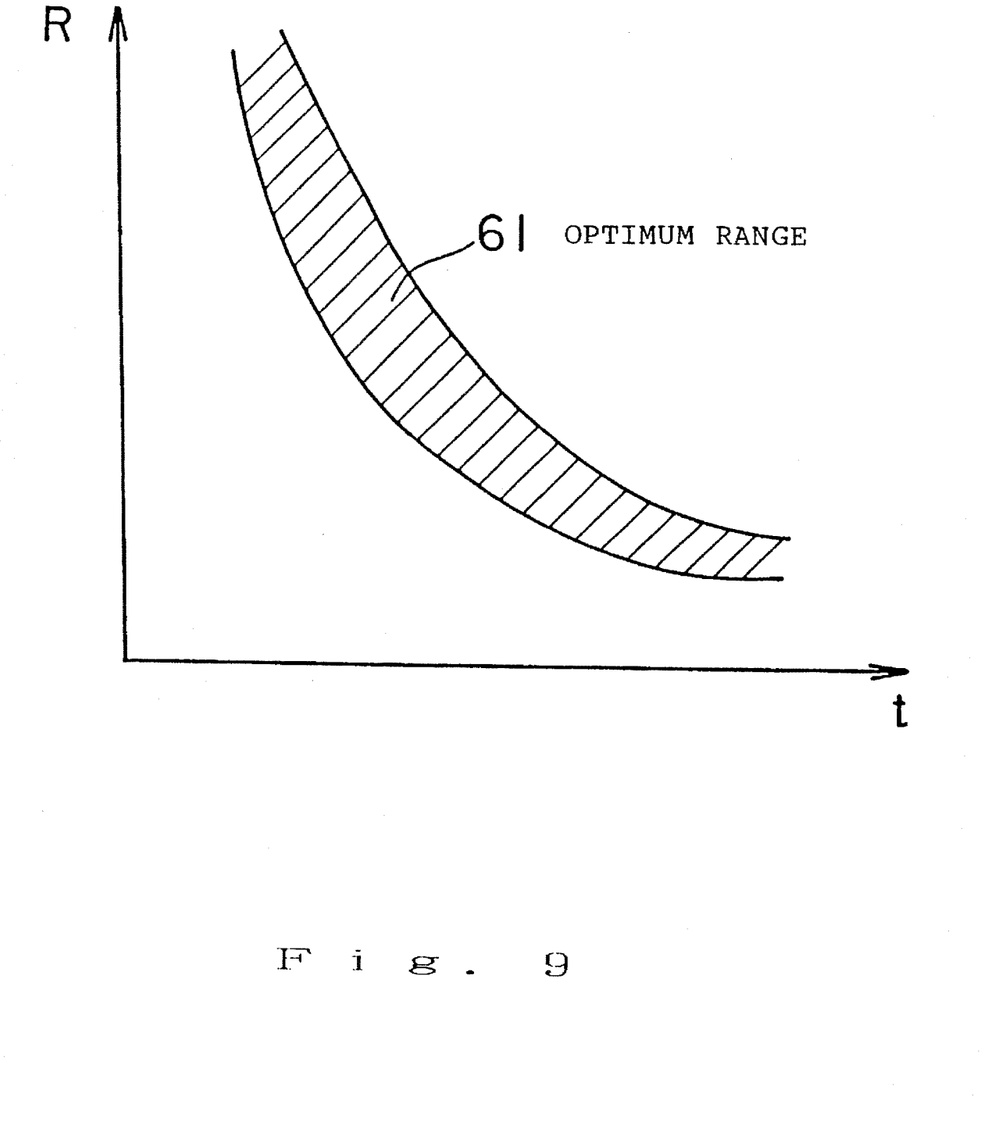
FIG. 9 illustrates an optimum range of the mixing proportion of the auxiliary gas in relation to the thickness of a zinc-plating layer.

FIG. 9 illustrates an optimum mixing proportion range of the auxiliary gas in relation to the thickness of a zinc plating layer. As shown in the figure, the mixing ratio R ($=Ar/(Ar-O_2)$) of the auxiliary gas in an optimum range 61 is lowered as a thickness t of the zinc plating layer is increased; this means that it is necessary to increase the proportion of oxygen in the auxiliary gas as the thickness t of the zinc plating layer is increased.

Figure 10:
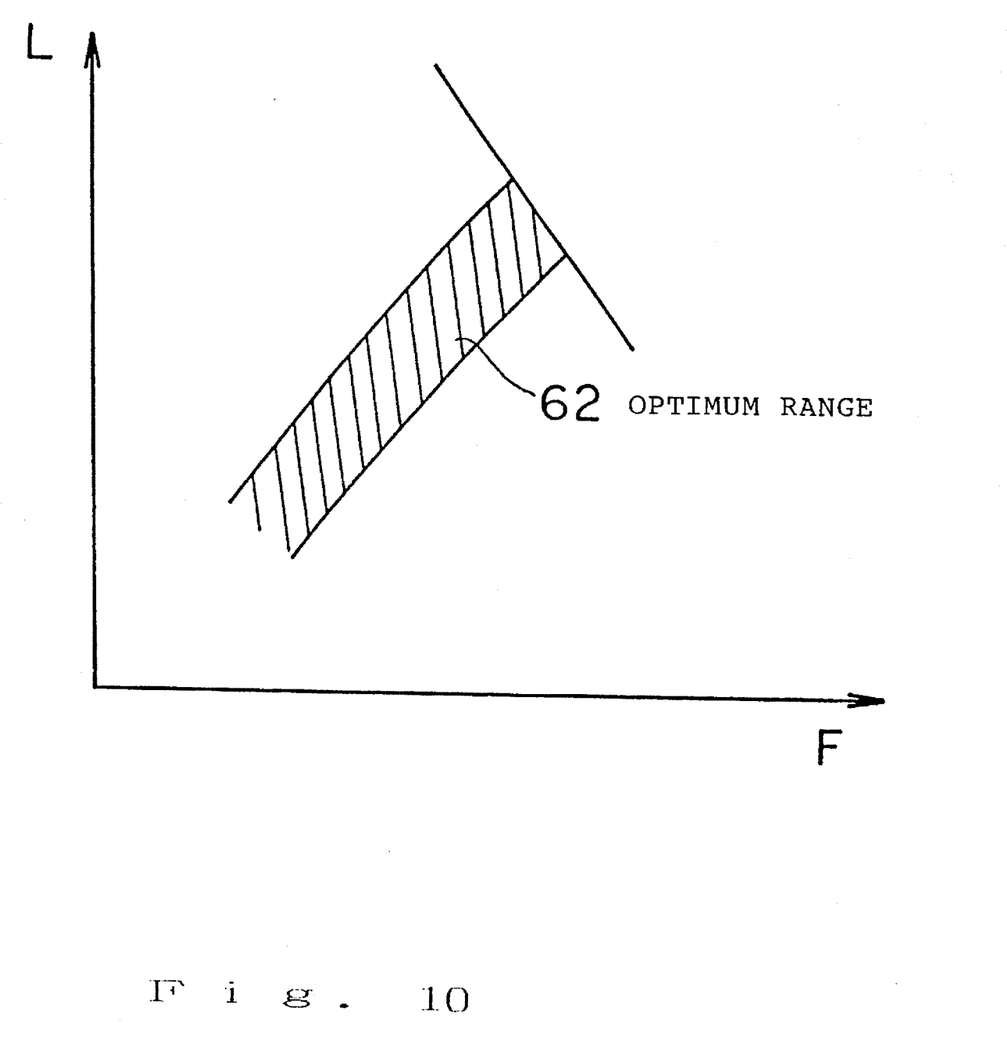
FIG. 10 illustrates an optimum range of the flow rate of the auxiliary gas in relation to the table feed speed.

FIG. 10 illustrates an optimum flow rate range of the auxiliary gas in relation to the table feeding speed. As shown in the figure, it is necessary to increase a flow rate L of the auxiliary gas as the feeding speed F is increased, but the feeding speed F has an upper limit, and therefore, no further effect is obtained even when the flow rate L is increased, if the upper limit thereof is exceeded. In such a case, another parameter, such as the mixing ratio R, must be changed. Data related to the optimum ranges of the auxiliary gas in relation to the aforementioned welding conditions is stored in the memory 51 of the NC device 50, and is used for controlling the mixing ratio R or the like of the auxiliary gas.

Figure 11:
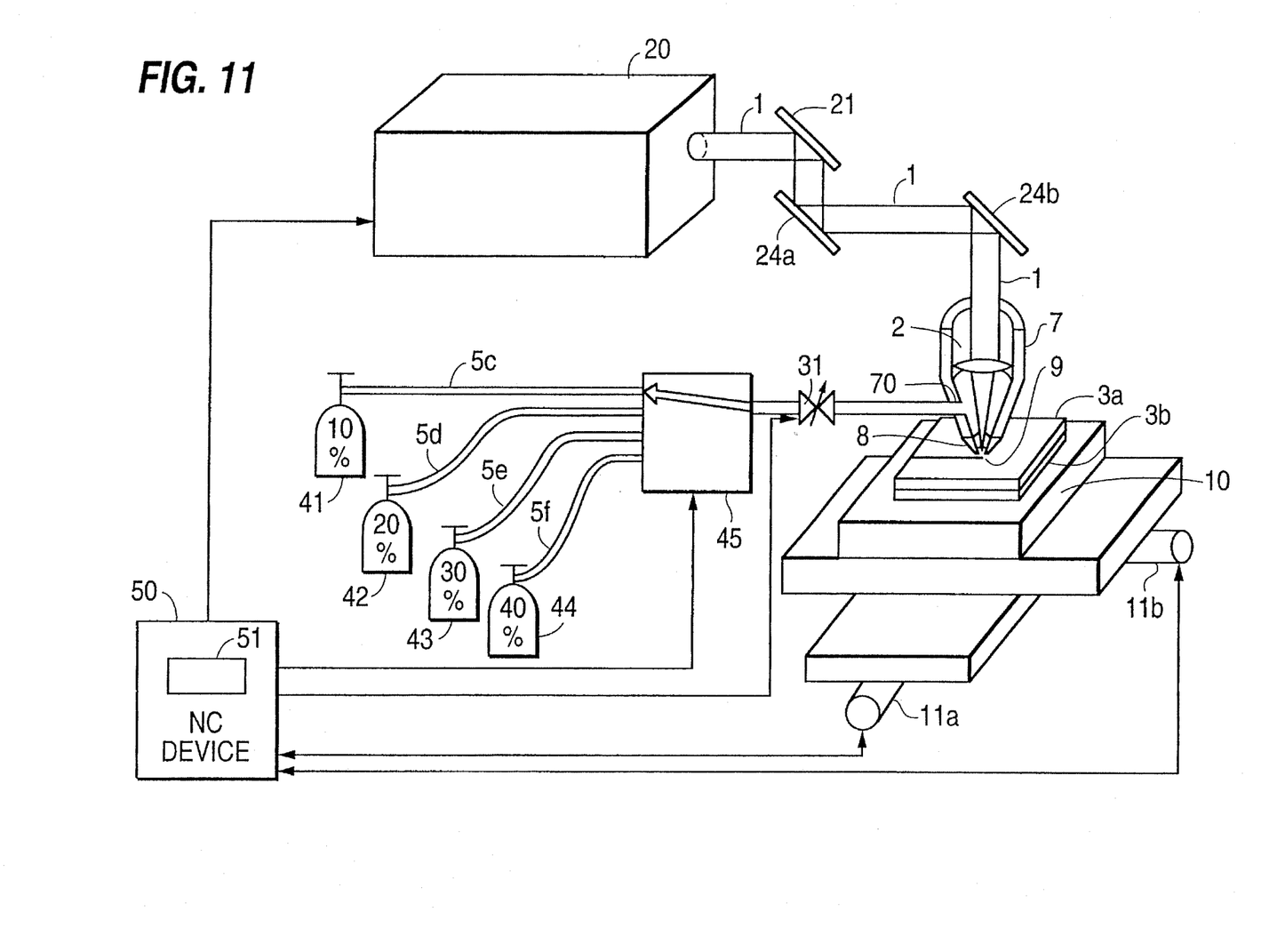
FIG. 11 illustrates the third embodiment of the present invention.

FIG. 11 illustrates the third embodiment of the present invention. This embodiment differs from the second embodiment in that the oxygen gas and the argon gas are first fed into separate mixed-gas cylinders 41, 42, 43, and 44 having several different mixing proportion levels. Namely, the mixing proportions of the mixed-gas cylinders 41, 42, 43, and 44 are 10%, 20%, 40%, and 60%, respectively. These mixed-gas cylinders 41 through 44 are selected by a gas selector 45, and the mixed gas from a selected mixed-gas cylinder is introduced into a nozzle 8 via a control valve 31.

The gas selector 45 and the control valve 31 are driven by the NC device 50, and therefore, an optimum auxiliary gas mixture required by the welding conditions is used for the laser welding.

In the foregoing description, zinc-plated steel sheets are used as the welding material, but obviously the same applies to other surface-treated metals coated with materials having melting points lower than those of the metals.

Further, in the above description, oxygen gas and another gas are mixed in the mixer 6, but the same effect also can be obtained by supplying the oxygen gas and another gas directly to the nozzle, and jetting the gases directly onto a welding spot.

Furthermore, the feeding speed (welding speed), output power, and the thickness of the zinc plating layer are used as the parameters (welding conditions) determining the mixing ratio and flow rate of the auxiliary gas, but other parameters such as the type of coating material (e.g., zinc+ nickel, alloy) and the shape of a welding bead also may be used.

Also, a continuous wave type laser beam may be used instead of the pulse wave type.

As described above, in the laser apparatus according to the present invention, oxygen gas is mixed in the auxiliary gas to thereby obtain a stable welding with a minimization of blowholes, without the need to provide a gap between the surface-treated metals. Similarly, a laser beam welding method wherein oxygen is mixed in the auxiliary gas is employed, and thus the occurrence of blowholes is kept to a minimum. Further, an auxiliary gas having an optimum mixing ratio and flow rate is supplied, to thereby ensure a good laser beam welding operation.

We claim:

1. A laser beam welding method of welding a surface-treated metal coated with a zinc material having an evaporation temperature lower than a melting point of the surface-treated metal, by using a continuous wave or pulse wave laser beam, wherein a mixture of oxygen and another gas is used as an auxiliary gas when welding;

wherein the mixture of oxygen and another gas are first mixed, and the mixture of oxygen and another gas is used for promoting the oxygen and zinc to react and produce zinc oxide.

2. The laser beam welding method according to claim 1, wherein said another gas is at least one of argon gas, helium gas, and nitrogen gas.

3. The laser beam welding method according to claim 1, wherein the surface-treated metal is a zinc-plated steel sheet.

4. The laser beam welding method according to claim 1, wherein the mixing ratio of the oxygen and another gas, and the flow rates of each of the oxygen and another gas are controlled in accordance with at least a thickness of a coating layer of the surface-treated metal, a type of coating material, and a shape of a welding bead.

5. A laser beam welding method of welding a surface-treated metal coated with a zinc material having an evaporation temperature lower than a melting point of the surface-treated metal, by using a continuous wave or pulse wave laser beam, wherein oxygen or a mixture of oxygen and another gas is used as an auxiliary gas when welding thereby promoting the oxygen and zinc to react and produce zinc oxide, wherein the mixture of oxygen and another gas is used as the auxiliary gas and the proportion of oxygen is increased as the welding speed is increased when mixing the oxygen and another gas.

6. A laser beam welding method of welding a surface-treated metal coated with a zinc material having an evaporation temperature lower than a melting point of the surface-treated metal, by using a continuous wave or pulse wave laser beam, wherein oxygen or a mixture of oxygen and another gas is used as an auxiliary gas when welding thereby promoting the oxygen and zinc to react and produce zinc oxide, wherein the mixture of oxygen and another gas is used as the auxiliary gas and the proportion of oxygen is increased as the laser output is increased when mixing the oxygen and another gas.

7. A laser beam welding method of welding a surface-treated metal coated with a zinc material having an evaporation temperature lower than a melting point of the surface-treated metal, by using a continuous wave or pulse wave laser beam, wherein oxygen or a mixture of oxygen and another gas is used as an auxiliary gas when welding thereby promoting the oxygen and zinc to react and produce zinc oxide, wherein the mixture of oxygen and another gas is used as the auxiliary gas and wherein the mixing ratio of the oxygen and another gas, and the flow rates of each of the oxygen and another gas are controlled in accordance with at least a thickness of a coating layer of the surface-treated metal, a type of coating material, and a shape of a welding bead.

8. A laser beam welding method of welding a surface-treated metal coated with a material having an evaporation temperature lower than a melting point of the surface-treated metal, by using a continuous wave or pulse wave laser beam, wherein oxygen or a mixture of oxygen and another gas is used as an auxiliary gas when welding thereby promoting the oxygen and zinc to react and produce zinc oxide;

wherein three sheets of surface-treated metal are superimposed one on the other and then welded in such a manner that a bottom sheet of superimposed three sheets of surface-treated metal is not melted.

9. The laser beam welding method according to claim 8, wherein the mixture of oxygen and another gas is used as the auxiliary gas and wherein the mixing ratio of the oxygen and another gas, and the flow rates of each of the oxygen and another gas are controlled in accordance with at least a thickness of a coating layer of the surface-treated metal, a type of coating material, and a shape of a welding bead.

* * * * *

UNITED STATES PATENT AND TRADEMARK OFFICE
CERTIFICATE OF CORRECTION

PATENT NO. : 5,539,180
DATED : July 23, 1996
INVENTOR(S) : Atsushi MORI et al.

It is certified that error appears in the above-indentified patent and that said Letters Patent is hereby corrected as shown below:

Title Page, [75], line 2, delete "Minamitsuru-gun" and insert --Yamanashi--;

line 3, delete "Hachioji" and insert --Tokyo--.

Column 3, line 15, delete "1O$e$" and insert --10$e$--.

Column 5, lines 3 and 12, delete "(Ar - $O_2$)" and insert --(Ar + $O_2$)--.

Signed and Sealed this

Twenty-ninth Day of October 1996

Attest:

BRUCE LEHMAN

*Attesting Officer*   *Commissioner of Patents and Trademarks*